Feb. 24, 1925.
J. H. WIGGINS
1,527,944
METHOD OF DISTILLING VOLATILE LIQUIDS
Filed May 12, 1921
2 Sheets-Sheet 2
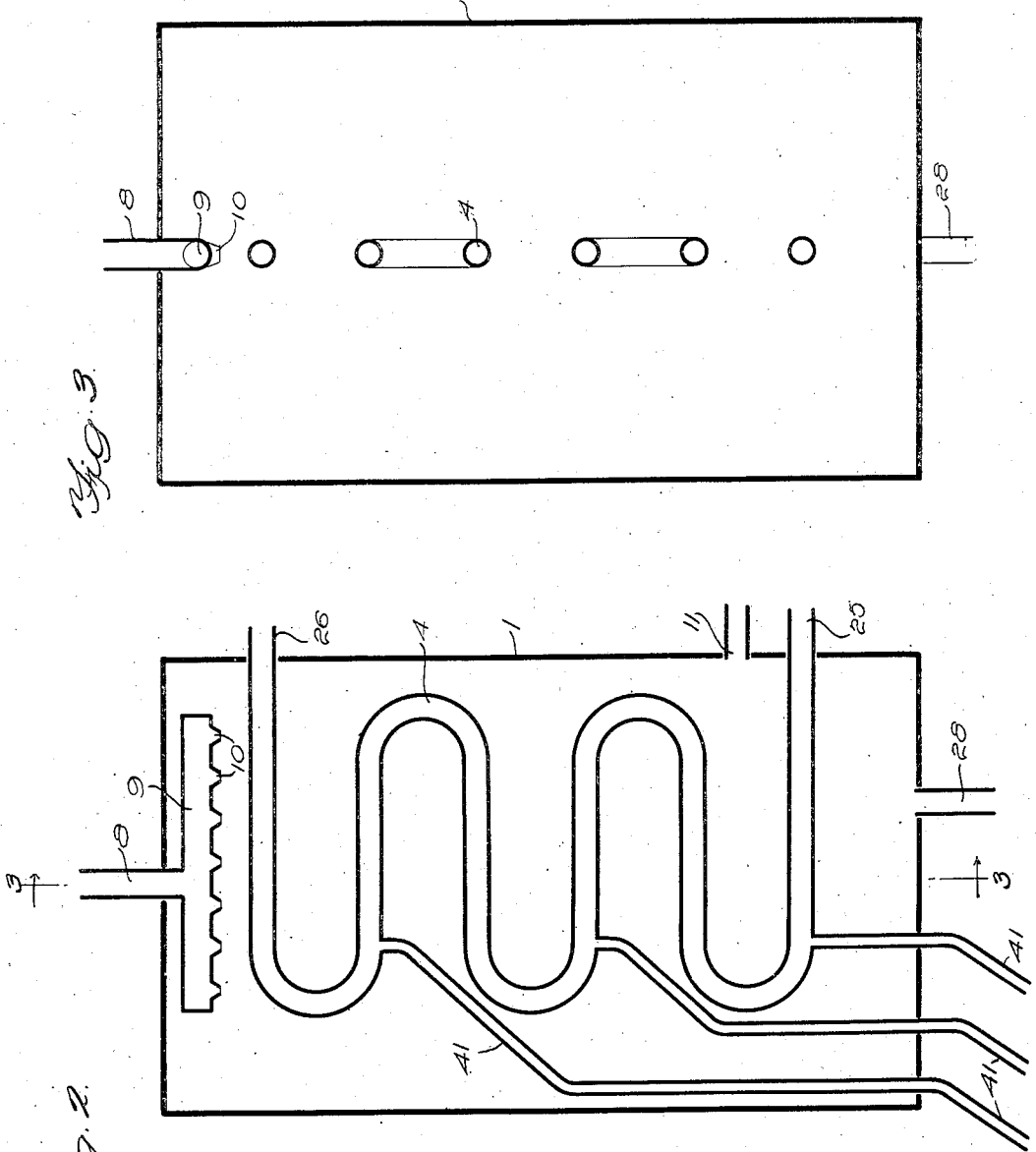
Inventor
J.H.Wiggins
By Ch.Parken
Attorney Patented Feb. 24, 1925.

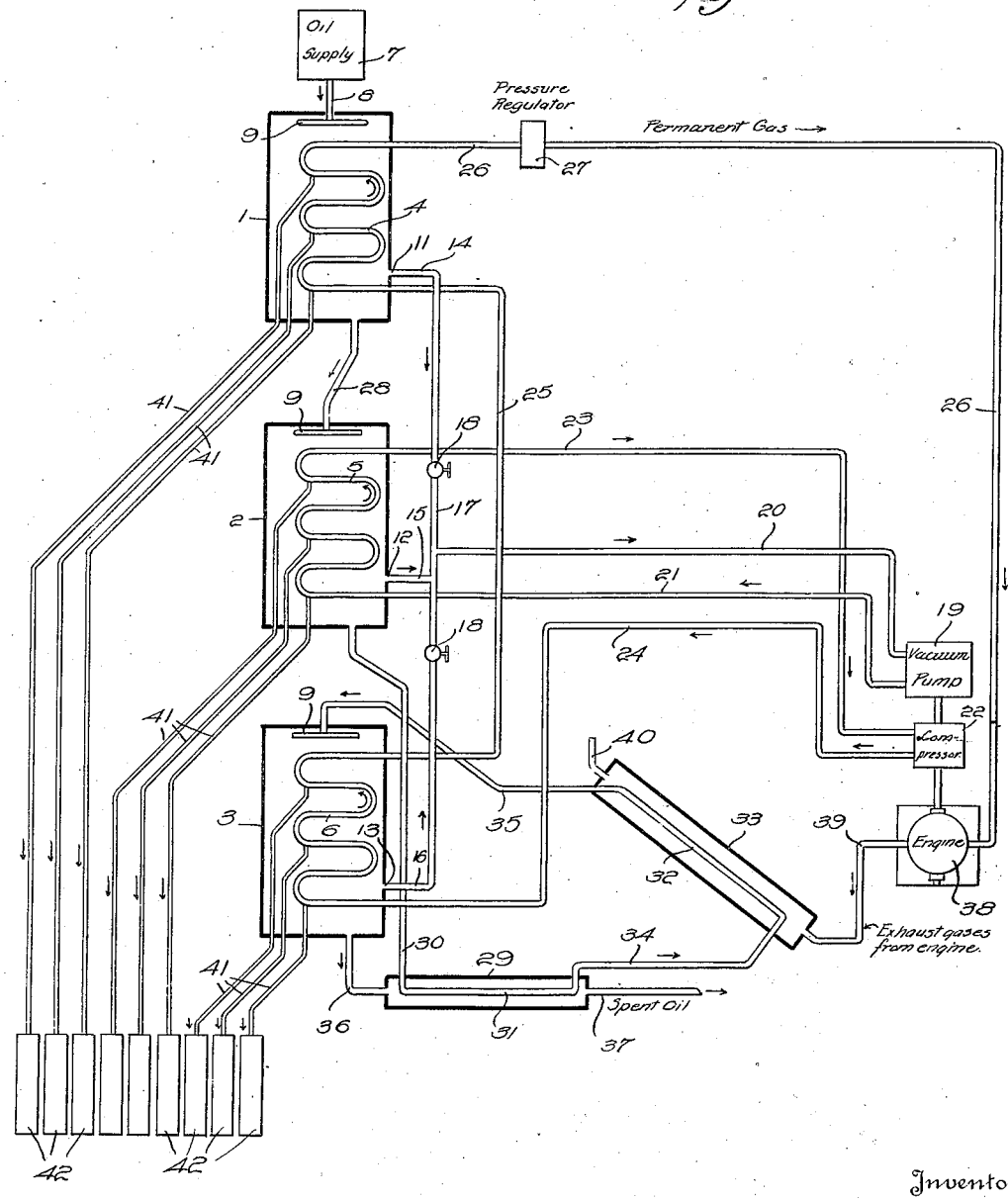

1,527,944

UNITED STATES PATENT OFFICE.

JOHN HENRY WIGGINS, OF BARTLESVILLE, OKLAHOMA.

METHOD OF DISTILLING VOLATILE LIQUIDS.

Application filed May 12, 1921. Serial No. 469,024.

*To all whom it may concern:*

Be it known that I, JOHN H. WIGGINS, a citizen of the United States, residing at Bartlesville, in the county of Washington and State of Oklahoma, have invented certain new and useful Improvements in Methods of Distilling Volatile Liquids, of which the following is a specification.

This invention relates to methods of and apparatus for distilling volatile liquids, and it comprises a method of distilling wherein oil, or other volatile liquid, is delivered to a closed chamber, a partial vacuum created therein, and the vapors formed by the reduction of pressure withdrawn, said withdrawn vapors being compressed and returned to a circulating system arranged in said chamber at a higher temperature whereby an interchange of heat between the incoming oil and the compressed vapor is obtained, vaporizing a portion of the oil, and condensing the compressed vapor. While various types of apparatus may be employed in performing the process, I prefer to employ an apparatus wherein a chamber is provided, having a distributing head arranged therein to deliver the oil in a plurality of streams. The closed circulating system arranged in the tank may consists of a coil of pipes or other similar apparatus, whereby the compressed vapors may travel in a circuitous path to submit the incoming oil to the higher temperature for as long a period as possible. Suitable means are provided for removing the vapor formed and returning the compressed vapor to the closed circulating system, and means are provided for withdrawing the condensed vapors or distillate from the closed circulating system.

It is an object of the present invention to vaporize the incoming oil at a low pressure whereby a minimum amount of heat is required, and condensing at a higher pressure.

A further object of the invention is to employ the heat extracted in the condensation of the compressed vapor in heating the incoming oil, thus effecting a saving of the sensible heat and latent heat of the vapors. By means of the method of condensing employed in the present invention, substantially 100 per cent of the latent heat supplied in the vaporization of the oil is recovered in the condensation of the oil and transmitted to the incoming oil being vaporized.

In the practice of the process on a commercial scale, it is advantageous to employ a plurality of chambers in which vaporization and condensation take place, the various chambers and the various circulating systems in the chambers being connected by suitable pipes or connections to deliver the fresh oil through each of the chambers arranged in series and to pass the vapors through the circulating systems in said chambers and in substantially a reverse direction whereby the cooler incoming oil is caused to interchange heat with the vapors from which part of the volatile constituents have been removed to recover the liquid constituents from the permanent gases.

In the accompanying drawings, I have shown an apparatus particularly suitable for use in performing the process. In this showing:

Figure 1 is a diagrammatic view showing a plurality of vaporizing chambers and connections, Figure 2 is a vertical sectional view, and, Figure 3 is a similar view on line 3—3 of Figure 2.

Referring to the drawings, the reference numerals 1, 2, and 3 designate the vaporizing chambers in which coils or pipes 4, 5, and 6, or other suitable circulating systems are arranged. An oil supply is represented at 7, communicating with the chamber 1 by pipe 8. Suitable valves or other control apparatus may be arranged in the pipe 8. The pipe 8 communicates with a header 9 arranged in the top of the tank, and extending transversely thereof. The header is provided with a plurality of openings 10 (see Figure 2) in its lower face to deliver the oil over the pipes of the circulating system in a thin film. The chambers are provided with vapor outlet openings 11, 12, and 13, respectively, arranged near the bottom. The outlet openings are provided with connecting pipes 14, 15, and 16, communicating with a pipe 17, having suitable valves 18 arranged therein. The pipe 17 communicates with a vacuum pump 19 by means of a pipe 20, and the pump in turn communicates with the coil 5 by means of a pipe 21. The outlet end of the coil 5 is connected to a compressor 22 by means of a pipe 23, the compressor in turn being connected to the lower end of coil 6 by means of a pipe 24. The upper end of the coil 6 is connected to the lower end of coil 4 by means of a pipe 25, and the upper end of coil 4 is provided with an outlet pipe 26 for permanent gas. As shown, a pressure regulator 27 may be arranged in this pipe.

The oil passing through chamber 1 is delivered to chamber 2 by means of a pipe 28, the chamber 2 being also provided with a header 9, to spread the oil over the coil 5. From the chamber 2, the oil which remains in the liquid state is conveyed to a heat interchanger 29 by means of a pipe 30 and passes through a closed pipe or coil 31 arranged therein. The pipe or coil 31 is connected to a pipe or coil 32, arranged in a heat interchanger 33 by means of a pipe 34. The pipe or coil 32 is connected to a header 9 arranged in the tank 3 by means of a pipe 35. From the bottom of tank 3, the spent oil enters a pipe 36, communicating with the heat interchanger 29, and the opposite end of the heat interchanger is provided with a spent oil discharge pipe 37.

The vacuum pump and compressor are operated by means of a suitable engine 38, which may be run by the permanent gas obtained during the distilling process, the pipe 26 being connected to the engine, as shown. The engine is provided with an exhaust pipe 39, connected to the heat interchanger 33 and the heat interchanger is provided with an exhaust outlet 40.

The coils 4, 5, and 6 are provided with offtakes 41 for the condensed vapors, the offtakes communicating with suitable storage tanks 42. Any suitable number of off-takes may be provided, and they may be connected to separate storage tanks, as shown, to separately collect the distillates driven off at different temperatures where close separation of fractions is desired, or a single storage tank may be provided if convenient.

In practicing the process, oil is delivered to chamber 1 by means of the feed pipe 8, the chamber 1 being connected to the vacuum pump 19, a partial vacuum is created therein causing a portion of the oil to vaporize. The vapor passes to the pipe 17 through the outlet 11, whence it is delivered to the vacuum pump. From the vacuum pump, the vapors collected in the various chambers are returned to the coil 5 in chamber 2, which acts as an intercooler. The outlet 5 of this coil is connected to the compressor 22 where the uncondensed vapors are placed under pressure and delivered to coil 6 in chamber 3. From this coil, the vapors pass through the coil 4 in chamber 1, the condensate being collected in each instance and the permanent gases are passed through pipe 26 to the engine. The oil flowing through the system passes through chamber 1 to chamber 2, wherein a slightly higher temperature exists and oil not vaporized in chamber 1 is vaporized at the higher temperature existing in chamber 2, and then passed to the vacuum pump and through the vapor circulating system. The oil not vaporized in chamber 2 is then conveyed to the heat interchanger 29 where an exchange of heat with the highly heated spent oil takes place. The oil is then conveyed through the heat interchanger 33, heated to a higher temperature by the exhaust gases from the engine and then conveyed to the header 9 in chamber 3.

In each of the chambers, the pressure of the oil is considerably lower than the pressure of the vapors in the closed circulating system arranged therein. The maintenance of a partial vacuum in the chambers to which the oil is subjected, permits the oil to be vaporized at a comparatively low temperature. The vapor formed is then compressed, before being delivered to the closed circulating system which raises the temperature of the vapors and raises the boiling point. In passing through the closed circulating system, the temperature of the vapors is lowered by contact with the walls of the coils 4, 5, and 6, the walls of the coils being cooled by the cooler surrounding oil. The vapors are thus cooled and the temperature lowered below the boiling point of some of the constituents, causing condensation. The condensate is collected in the pipes 44 and conveyed to the storage tanks 42.

Due to the difference in temperature, the interchange of heat which lowers the compressed vapor to a condensing temperature, raises the oil, which is under a partial vacuum, to be vaporized.

The latent heat of the compressed vapors which is liberated when the vapors are condensed, is transmitted to the oil in the chambers and used in vaporizing the oil, whereby substantially the entire heat evolved is saved and utilized.

It will, therefore, be apparent that by means of the process herein disclosed, and through the use of suitable mechanical means to permit vaporization of the oil at a reduced pressure, and condensation at a higher pressure, a method of vaporizing and condensing is obtained wherein substantially all of the heat required to vaporize the oil is recovered when the vapors are condensed.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. The method of distilling hydrocarbon oils which comprises passing the oils into a chamber, maintaining a vacuum in said chamber to evaporate oil and withdraw vapors from said chamber, compressing said vapors to liquefy and heat them, returning the condensate through said chamber in a closed coil to evaporate additional liquid, said vacuum pump and compressor being operated by an internal combustion engine, and preheating the oil by passing it through a heat interchanger in counter-current to the flow of the exhaust gases of said engine.

2. The method of distilling hydrocarbon oils which comprises passing said oils through a plurality of chambers arranged in series, maintaining a vacuum in said chambers, withdrawing the vapors produced by the reduction of pressure from said chambers, compressing the vapors, and passing the compressed vapors through closed coils in said chambers to heat the incoming oil and cool the vapors, the uncondensed oil passing from one of said chambers being passed through a heat interchanger against the flow of exhaust gases from an internal combustion engine before passing to another of said chambers.

3. The method of distilling hydrocarbon oils which comprises passing the oils into a chamber, maintaining a vacuum in said chamber to evaporate oil and withdraw vapors from said chamber, compressing said vapors to heat them, returning the heated vapors through said chamber in a closed coil to cool and condense said vapors and to evaporate additional liquid, said vacuum pump being operated by an internal combustion engine, and heating the oil to be distilled in heat interchangers, the source of heat for said interchangers being the heat ordinarily lost by the engine in its exhaust gas.

In testimony whereof I affix my signature in presence of two witnesses.

JOHN HENRY WIGGINS.

Witnesses:
BULA HARDWICK,
H. T. BECKWITH.